United States Patent [19]
Powers

[11] 4,192,835
[45] Mar. 11, 1980

[54] TRIPLE SEAL BUBBLE CAP ASSEMBLY WITH KIDNEY SHAPED INNER TUBULAR SLEEVE FOR A GAS AND LIQUID CONTACT APPARATUS

[75] Inventor: John R. Powers, Port Arthur, Tex.
[73] Assignee: Texaco Inc., White Plains, N.Y.
[21] Appl. No.: 871,315
[22] Filed: Jan. 23, 1978

Related U.S. Application Data

[63] Continuation-in-part of Ser. No. 712,452, Aug. 6, 1976, abandoned, and a continuation-in-part of Ser. No. 845,200, Oct. 25, 1977, Pat. No. 4,146,950.

[51] Int. Cl.² ............................................. B01D 3/20
[52] U.S. Cl. ............................ 261/114 A; 261/114 R
[58] Field of Search ................... 261/114 R, 114 A; 29/157 R

[56] References Cited

U.S. PATENT DOCUMENTS

| | | | |
|---|---|---|---|
| 2,320,822 | 6/1943 | Kerrigan | 261/114 A |
| 2,382,489 | 8/1945 | Koppels | 285/205 |
| 2,438,536 | 3/1948 | Cairns | 261/114 A |
| 2,461,729 | 2/1949 | Glitsch | 261/114 A |
| 2,580,260 | 12/1951 | Winters | 261/114 A |
| 2,645,469 | 7/1953 | Plossl et al. | 261/114 A |
| 2,653,018 | 9/1953 | Dunn | 261/114 A |
| 2,705,136 | 3/1955 | Glitsch | 261/114 A |
| 2,710,177 | 6/1955 | Young et al. | 261/114 A |
| 2,785,882 | 3/1957 | Wansink et al. | 261/114 A |
| 4,059,877 | 11/1977 | Powers | 261/114 A |

FOREIGN PATENT DOCUMENTS 216478  7/1961  Austria .............................. 261/114 A

*Primary Examiner*—Frank W. Lutter
*Assistant Examiner*—Gregory N. Clements
*Attorney, Agent, or Firm*—Carl G. Ries; Thomas H. Whaley; Theron H. Nichols

[57] ABSTRACT

The basic bubble cap assembly for sealing a hole in a tray deck for example, comprises an inner tubular sleeve having a lower flanged end telescopic with the inner surface of a tubular riser having a lower flanged end, and gasket means for sealing the lower flanged ends of both the telescopic tubular riser and the inner tubular sleeve to the upper and lower peripheral surfaces around the hole for providing a double seal between the tray deck and the bubble cap assembly, for minimizing leakage, and for assuring proper alignment of the bubble cap assembly relative to the tray deck. Three modifications are disclosed. One comprises a spider secured on the lower end of the hold-down stud for placing it in tension for compressing the two sealing gasket means. A second embodiment comprises a hold-down stud lower end fastened to a cross bar which is welded to the internal surfaces of the inner tubular sleeve. The third embodiment includes an inner tubular sleeve having two horizontal cuts on opposite cylindrical sides of the upper portion thereof extending horizontally for a substantial distance for forming two kidney shaped inwardly bent portions contiguous with the hold-down stud to which it is welded.

9 Claims, 8 Drawing Figures

TRIPLE SEAL BUBBLE CAP ASSEMBLY WITH KIDNEY SHAPED INNER TUBULAR SLEEVE FOR A GAS AND LIQUID CONTACT APPARATUS

BACKGROUND OF THE INVENTION

This is a continuation-in-part of application Ser. No. 712,452, filed Aug. 6, 1976, now abandoned, and Ser. No. 845,200 filed Oct. 25, 1977, now U.S. Pat. No. 4,146,950 issued Nov. 29, 1977.

In the chemical and petroleum refining industries gases are contacted with liquids in a gas and liquid contact apparatus, as in a contact tower for fractionating, absorbing, scrubbing, and the like.

The three different bubble cap assemblies are utilized in a gas and liquid contact apparatus comprising a stack of perforated trays in a tower with downcomers and weirs for flowing fluids from the top of the tower down over a tray deck to a weir, over the weir into a downcomer to the next tray deck below, and thus across the down through all trays consecutively until reaching the bottom where it is discharged, while a gas is introduced in the tower at the bottom and is forced through the holes in each tray deck covered with bubble cap assemblies which insure that all gas in each chamber has bubbled through a tray deck of liquid in the bottom of that chamber before passing upwardly through the next tray of liquid to exhaust out the top of the tower.

Thus as this counterflow of gas and liquid takes place, any constituents in the gas are condensed by contact with the liquid and are discharged therewith at the bottom of the tower, while any remaining unabsorbed gas and additional vapor is exhausted from the top of the tower with the other gases.

Improved bubble cap assemblies including means for mounting them on a tray of a gas and liquid contact apparatus is highly desirable. Disclosed herein are three different bubble cap assemblies.

OBJECTS OF THE INVENTION

Accordingly, a primary object of this invention is to provide a few improved bubble cap assemblies for mounting over holes in tray decks of a gas and liquid contact apparatus with both an inner tubular sleeve and a tubular riser with annular flanges on each of the inner tubular sleeve and the tubular riser for providing a double seal between the tray deck and the bubble cap assembly for minimizing leakage.

Another primary object of this invention is to provide a bubble cap assembly that assures proper alignment of the bubble cap assembly relative to the tray deck.

A further object of this invention is to provide three different bubble cap assemblies.

A still further object of this invention is to provide a bubble cap assembly that has a reduced number of assembly pieces for reducing the number of fabrication steps for reducing fabrication costs of the complete bubble cap assembly.

A further object of this invention is to provide a bubble cap assembly that is easy to operate, is of simple configuration, is economical to build and assemble, and is of greater efficiency for use in a gas and liquid contact apparatus.

Other objects and various advantages of the disclosed three bubble cap assemblies will be apparent from the following detailed description, together with the accompanying drawings, submitted for purposes of illustration only and not intended to define the scope of the invention, reference being made for that purpose to the subjoined claims.

BRIEF DESCRIPTION OF THE DRAWINGS

The drawings diagrammatically illustrate by way of example, not by way of limitation, a few forms or mechanisms of the invention wherein like reference numerals have been employed to indicate similar parts in the several views in which:

FIG. 6 is a vertical sectional view taken at 7—7 on FIG. 6; and

The invention disclosed herein, the scope of which being defined in the appended claims, is not limited in its application to the detailed construction and arrangement of parts shown and described since the invention is capable of other embodiments. Also, it is to be understood that the phraseology or terminology employed herein is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as indicated in the appended claims.

DESCRIPTION OF THE BASIC METHODS

Figure 1:
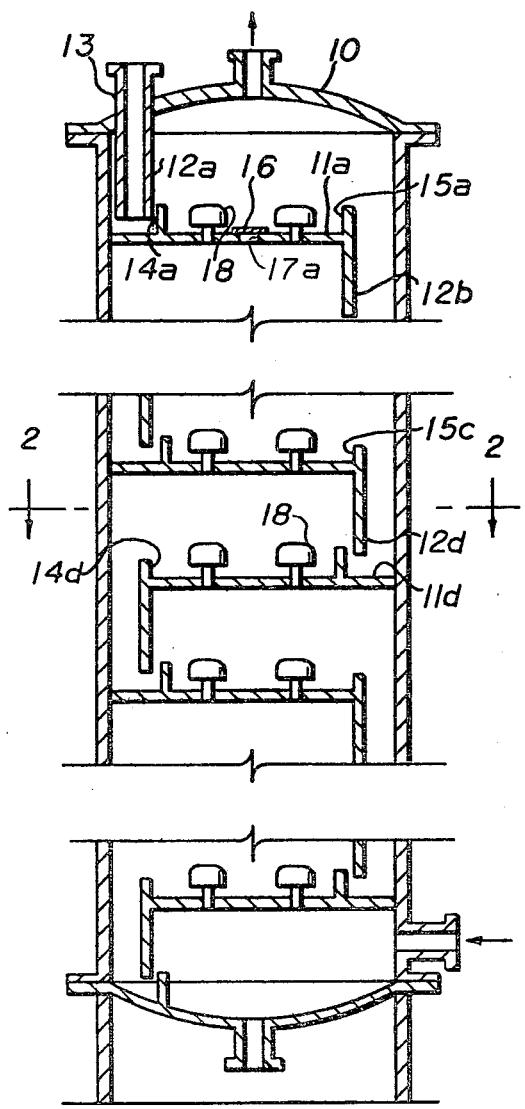
FIG. 1 is a schematic diagrammatical vertical sectional view of a fractionation tower including the new bubble cap assemblies throughout.
Figure 2:
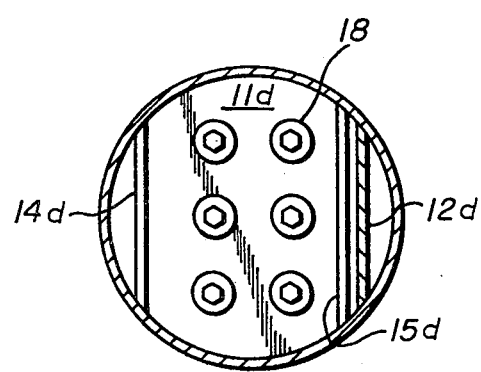
FIG. 2 is a sectional view taken at 2—2 of FIG. 1.

This invention comprises basically three different bubble cap assemblies for mounting over holes in tray decks of a gas and liquid contact apparatus as illustrated in FIG. 1.

A basic invention comprises a bubble cap assembly 18 for sealing a hole (17) having upper and lower peripheral surfaces in a tray deck (11).

DESCRIPTION OF THE THREE BUBBLE CAPS FORMED BY THE ABOVE METHODS

FIG. 1 discloses a conventional gas and liquid contact apparatus 10 but illustrated with the new invention therein. This contact apparatus 10 comprises a multiplicity of tray decks stacked one above the other, each tray deck being the enantiomorphic analogue of the one below. Tray deck 11a, for example, has a downcomer 12a which receives liquid from the top of the fractionation tower inlet 13. The liquid that passes down the downcomer enters the tray deck after passing over the first weir 14a. Then the liquid spreads out over the tray deck to a height as controlled by a far or second weir 15a on the far side of the tray deck. A manhole 16 provides access for adjustment and/or repair of the tray deck and the mechanisms mounted thereon. Any number of manholes may be provided. Vapor or gas holes are formed all over the tray deck, hole 17a being a typical hole. Each of the gas holes 17 has a bubble cap assembly 18 therein for causing the gas to bubble through the liquid but preventing liquid from passing down through the hole below. A suitable frame or brace structure supports the tray deck. As the liquid passes over the second weir 15a it drops down downcomer 12b to the next tray deck, below. The rest of the trays are similar. The principal feature of this disclosure is the bubble cap assembly 18 as illustrated in greater detail in FIGS. 3–8.

MODIFICATIONS OF FIGS. 3 AND 4

Figure 3:
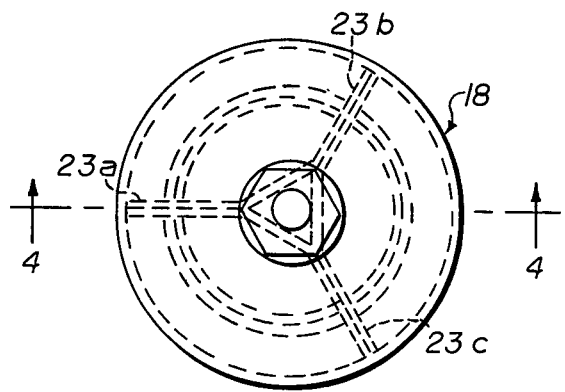
FIG. 3 is a top view of one modification of a bubble cap assembly.
Figure 4:
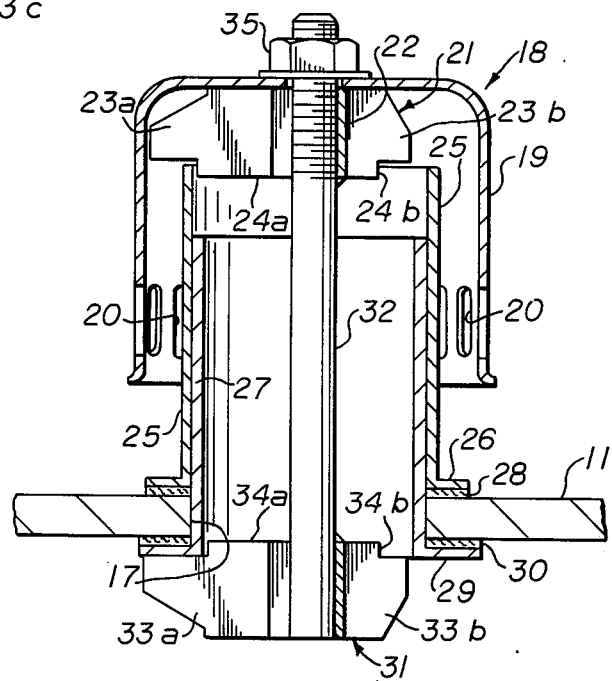
FIG. 4 is a vertical sectional view taken at 4—4 on FIG. 3.

FIG. 3 is a top view of the first modification of the bubble cap assembly of FIG. 4.

FIG. 4 discloses a bubble cap assembly 18 which fills the hole to allow gas to pass up from the tray deck below up through this bubble cap assembly, through the liquid and then allows the gas to bubble up to the surface of the liquid and up through the tray deck above. A bell-shaped bubble cap 19 with slots 20 in the skirt allows the gas to bubble out or pass out from inside the bell to the liquid outside. Bubble cap 19 rests on or is supported by spider 21. This spider comprises a sleeve 22 with three equally spaced arms 23a, 23b and 23c fixed thereto (the latter arm not shown) and radiating outwardly therefrom. Arms 23a–23c have a downwardly projecting portion 24a–24c (the latter not shown) on each, fitted down internally of a tubular riser 25 for centering the spider and the bubble cap thereover.

With the spider 21 and bell-shaped bubble cap 19 resting on the top of tubular riser 25, the bottom of the tubular riser rests on the upper peripheral surface of the peripheral edge of a hole 17. This bottom portion of the tubular riser comprises an annular flange 26 formed on the outer surface at the lower end of the tubular riser for resting on top of the tray deck peripheral edge surface around the hole. A gasket 28 is positioned between this annular flange 26 and the tray deck 11. An inner tubular sleeve 27 is formed internally of and concentric with the tubular riser 25 and contiguous with the inner surface thereof for extending down below the tubular riser internally of the hole 17 and protruding slightly down below the hole. Another annular flange 29 is formed on the protruding portion of the inner tubular sleeve 27 and extends outwardly of the inner tubular sleeve contiguous with the lower or under surface of the tray deck 11 around the peripheral edge of the hole. Between this annular flange 29 and the tray deck is positioned another annular gasket 30. Under the bottom of the hole is a lower spider 31 formed integral with a hold-down stud 32. This lower spider likewise is formed with three protruding or radiating arms from the lower end of the hold-down stud.

An important feature of the disclosed inner tubular sleeve and the tubular riser is that a major portion of the cylindrical surface of each is in sliding contact with the other for ensuring a fluid-tight and gas-tight joint and a leak-proof seal. Principally, proper alignment is assured.

While any number of arms may be utilized, as for the lower spider, three are preferred,, as described and illustrated herein. Lower spider 31 has arms 33a, 33b, and 33c (not shown in FIG. 4), each having a portion 34a, 34b and 34c, protruding up into the lower end of the inner tubular sleeve 27. These protruding portions of the lower spider center the spider as well as the lower end of the hold-down stud 32 to which the spider is securely fastened. The hold-down stud 32 extends from the bottom of the hole up through the bubble cap assembly including the sleeve 22 of the upper spider 21 and then protrudes up through the bubble cap 19. A fastening device or pressure applying means 35, such as but not limited to, a nut and washer 35 are screwed on to the top thereof for compressing all parts of the assembly together. With compression placed on all parts, particularly the tubular riser and inner tubular sleeve annular flanges 26 and 29, respectively, the gaskets 28 and 30 thereunder are compressed into a gas and liquid sealing position and condition for forming a triple leak-proof seal round the hole.

MODIFICATION OF FIG. 5

Figure 5:
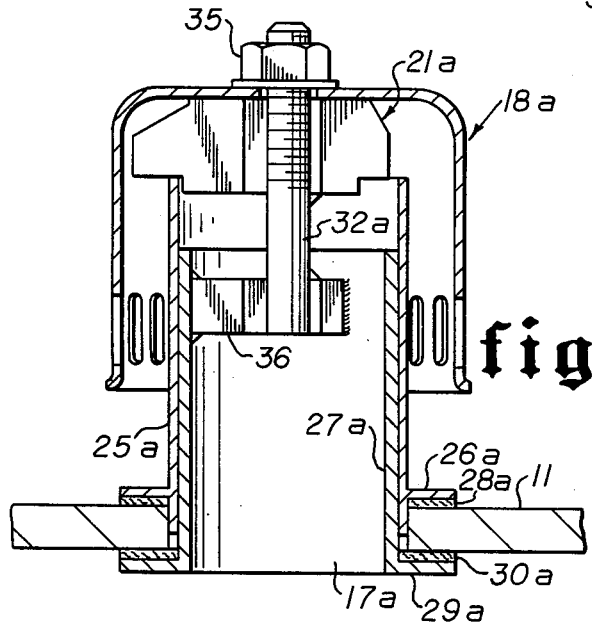
FIG. 5 is a second modification of a bubble cap assembly.

FIG. 5 illustrates, in vertical section, a modified bubble cap assembly 18a. Here, the bubble cap portion of the bubble cap assembly is similar to the first embodiment, as is the supporting upper spider 21a. The tubular riser 25a of the second embodiment protrudes down internally of the hole 17a with its annular flange 26a secured and made integral with the tubular riser at a spaced distance slightly above the bottom edge of the tubular riser. This annular flange 26a likewise rests on and is sealed to the upper peripheral edge of the hole 17a in the deck tray 11 with gasket 28a. The inner tubular sleeve 27a of this embodiment lies internally and contiguously with the inner surface of the tubular riser 25a and protrudes down through the hole and ends with an annular flange 29a formed integral therewith, which flange protrudes out and is sealed with a sealing gasket 30a to the peripheral lower edge surface of the hole 17a in the tray deck. A major portion of the outer cylindrical surface of the tubular inner sleeve 27a likewise is in tight sliding contact with a major portion of the inner cylindrical surface of the cylindrical riser 25a to form a leak-proof seal around the hole 17. An attachment bar 36 comprising three legs, preferably, is welded to the inner surface of the inner tubular sleeve 27a and likewise the attachment bar is secured, as by welding, to the bottom of the stud 32a, whereby tightening of the nut on the upper end of the stud compressing the assembly together, including particularly the two gaskets, to form a second gas and fluid-tight bubble cap assembly 18a. This attachment bar 36 likewise is merely a connecting portion between the stud 32a and the cylindrical inner sleeve and positioned below the upper end of the cylindrical riser 25a. Thus, three leak-proof seals are formed. The smaller parts required in this modification of FIG. 5 results in a less expensive and easier to manufacture bubble cap assembly.

MODIFICATIONS OF FIGS. 6–8

Figure 6:
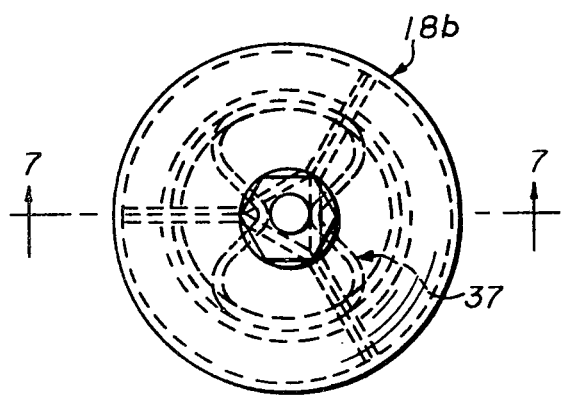
FIG. 6 is a top view of a third bubble cap assembly.
Figure 8:
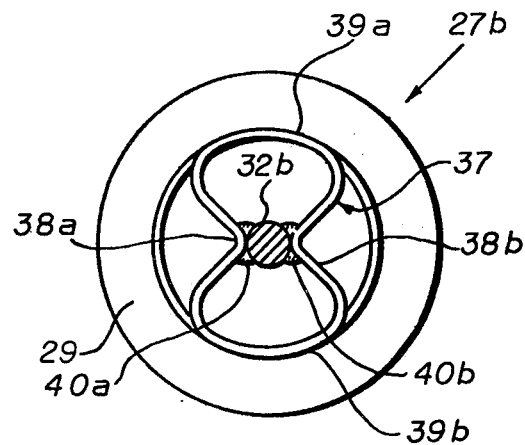
FIG. 8 is a top view of the inner tubular sleeve per se of FIG. 7 illustrated with the retaining bolt welded thereto, and with the bubble cap and cylindrical riser removed.
Figure 7:
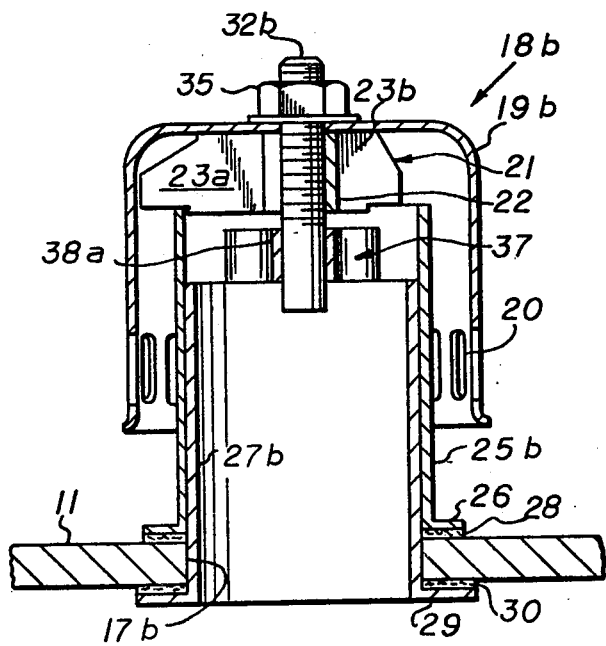

FIGS. 6–8 disclose the third embodiment of a bubble cap assembly wherein FIG. 6 is a top view, FIG. 7 is a vertical sectional view taken at 7—7 on FIG. 6, and FIG. 8 is a top view of the inner tubular sleeve 27b per se.

The conventional lower spider for attaching the lower end of a hold-down stud to the lower end of the inner tubular sleeve as illustrated in the first modification of FIGS. 3–4 is not required in this embodiment for holding the individual elements of the bubble cap assembly together. This lower spider for interconnecting the bottoms of some of the other elements of the assembly is one element that is eliminated in the above disclosed bubble cap assembly. Instead, a short hold-down stud is attached to the top of the inner tubular sleeve.

As described in the method of the second continuing application identified above for forming this embodiment, a horizontal saw cut is made on each side of the inner tubular sleeve for a distance of about 120° of the cylindrical wall near the top. Then the kidney shaped upper portion 37, FIGS. and 8, is formed by bending in or cold rolling in the side portions 38a and 38b, FIG. 8, until they are contiguous with the holddown stud 32b as seen in FIG. 8. Also as viewed in FIG. 8, the rearward and forward positions, 39a and 39b respectively, of the kidney shaped upper portion 37 are formed integral with the remaining lower portion of the inner tubular sleeve 27b. The bent in side portions 38a and 38b, FIG. 8, of the kidney shaped upper portion 37 are welded at their centers to a bubble cap retaining or hold-down stud 32b with welds, or the like 40a and 40b. This kidney shaped upper portion 37 likewise is merely a connecting portion between the stud 32b and the cylindrical inner sleeve 27b above the lower end of the inner sleeve and below the upper end of the cylindrical riser 25a.

The lower sealing portion of the bubble cap assembly 18b, FIGS. 6 and 7, is similar to that of 18 in FIGS. 3 and 4. A sealing gasket 28, FIG. 7, is inserted between the annular flange 26 on the bottom of the tubular riser 25b, FIG. 7, and the peripheral surface around the hole 17b in the tray deck 11. The second annular gasket 30 is inserted between the annular flange 29 on the bottom of the inner tubular sleeve 27b and the peripheral under surface around the hole 17b in the tray deck.

As viewed in FIG. 7, the hold-down stud 32b extends upwardly from the welded connnection, through the kidney shaped connecting portion 37 on the inner tubular sleeve through the sleeve 22 of the spider 21, and through the center top of the bubble cap assembled. With compression placed on all parts by tightening of a pressure applying means nut 35, particularly on the upper and lower riser annular flanges and the gaskets thereunder, a gas-tight and a liquid-tight seal, or double seal is formed around the hole 17b.

Further, a major portion of the surfaces of the tubular riser and the inner tubular sleeve are in tight sliding contact with each other for insuring a gas-tight and a fluid-tight fit between the two tubular elements, or third seal on the bubble cap assembly.

Further, the number of assembly pieces are reduced for reducing the number of fabrication steps for reducing fabrication costs of the complete bubble cap assembly, for assuring proper alignment of the bubble cap assemly relative to the tray deck, and for providing a triple seal between the tray deck and the bubble cap assembly for minimizing leakage in the bubble cap assembly.

Accordingly, it will be seen that at least three embodiments of a bubble cap assembly are disclosed that will operate in a manner which meets each of the objects set forth hereinbefore.

While only three mechanisms have been disclosed, it will be evident that various other bubble cap assemblies are possible in the arrangement and construction of the disclosed modification without departing from the scope of the invention and it is accordingly desired to comprehend within the purview of this invention such modifications as may be considered to fall within the scope of the appended claims.

I claim:

1. A multiple sealed bubble cap assembly for a gas liquid contact apparatus comprising,
    (a) a tubular riser having an annular flange and gasket sealed to the upper peripheral surface around a hole in a tray deck in a bubble tower and supporting a bubble cap thereon,
    (b) an inner tubular sleeve protruding internally of said tubular riser,
    (c) a hold down stud for urging said inner tubular sleeve into sealing engagement with said tubular riser,
    (d) said inner tubular sleeve including an annular flange having a gasket for sealing said annular flange to the under peripheral surface around the hole in the tray deck for forming a double seal around the hole for minimizing leakage,
    (e) said inner tubular sleeve having two opposite sides of the upper portion thereof cut inwardly a distance to include about 120° of the circumference of each of the two opposite sides,
    (f) said two cut portions of said inner tubular sleeve being bent kidney shaped and contiguous with said upright hold-down stud, and
    (g) said two kidney bent shaped portions being rigidly secured to said upright hold-down stud for providing a bubble cap assembly of reduced number of pieces requiring a reduced number of fabrication steps for lowering fabrication costs of the complete bubble cap assembly.

2. A fluid tight bubble cap assembly for sealing a hole in a tray deck for a gas liquid contact apparatus comprising,
    (a) an inner tubular sleeve, a tubular riser, a bubble cap, and an upright hold-down stud therein for holding down said bubble cap,
    (b) said tubular riser supporting said bubble cap and having an inner tubular surface and said inner tubular sleeve having an outer tubular surface internally of said tubular riser,
    (c) said upright hold-down stud comprising means for urging said tubular riser into sealing engagement with said inner tubular sleeve,
    (d) a major portion of said inner tubular surface of said tubular riser being in surface-to-surface contact with a major portion of said outer tubular surface of said inner tubular sleeve for forming a fluid tight seal between said tubular riser and said inner tubular sleeve for minimizing leakage,
    (e) said inner tubular sleeve having two opposite sides of the upper portion thereof cut inwardly a distance to include about 120° of the circumference of each of the two opposite sides,
    (f) said two cut portions of said inner tubular sleeve being bent kidney shaped and contiguous with said upright hold-down stud, and
    (g) said two kidney bent shaped portions being rigidly secured to said upright hold-down stud for providing a bubble cap assembly of reduced number of pieces requiring a reduced number of fabrication steps for lowering fabrication costs of the complete bubble cap assembly.

3. A triple sealed bubble cap assembly for sealing a hole in a tray deck in a bubble tower for a gas liquid contact apparatus comprising,
    (a) a tubular riser having an annular flange sealed, with a gasket, to the upper peripheral surface around a hole in a tray deck in a bubble tower for supporting a bubble cap on an upright hold-down stud having pressure applying means on top thereof,
    (b) an inner tubular sleeve with an annular flange having a gasket for sealing said annular flange to the under peripheral surface around the hole in the tray deck for forming a second seal around the hole, (c) said inner tubular sleeve having an outer tubular surface and said tubular riser having an inner tubular surface, (d) a major portion of said inner tubular surface of said tubular riser being in surface-to-surface contact with a major portion of said outer tubular surface of said inner tubular sleeve for forming a third seal around the hole in the tray deck for forming the triple sealed bubble cap assembly having minimum leakage, (e) said inner tubular sleeve having two opposite sides of the upper portion thereof cut inwardly a distance to include about 120° of the circumference of each of said two opposite sides, (f) said two cut portions of said inner tubular sleeve being bent kidney shaped and contiguous with said upright hold-down stud, and (g) said two kidney bent shaped portions being rigidly secured to said upright hold-down stud for providing a bubble cap assembly of reduced number of pieces requiring a reduced number of fabrication steps for lowering fabrication costs of the complete bubble cap assembly.

4. A bubble cap assembly for sealing a hole in a tray deck including a bubble cap held down on top of a tubular riser with an upright hold-down stud supported by an inner tubular sleeve, wherein (a) said inner tubular sleeve has two opposite sides of the upper portion thereof cut inwardly a distance to include at least substantially 110° of the circumference of each of said two opposite sides, (b) said two cut portions of said inner tubular sleeve being bent kidney shaped and adapted to be contiguous with the upright hold-down stud, and (c) said two kidney bent shaped portions being adapted to be rigidly secured to the upright hold-down stud for providing said bubble cap assembly of reduced number of pieces requiring a reduced number of fabrication steps for lowering fabrication costs of the complete bubble cap assembly.

5. A bubble cap assembly for sealing a hole in a tray deck comprising, (a) a bubble cap held down on top of an inner tubular sleeve with an upright hold-down stud, (b) said inner tubular sleeve having an outside surface diameter substantially equal to the hole diameter and a gasket on the bottom surface of the hole, (c) a tubular riser being contiguous with the major portion of said outer surface of said inner tubular sleeve and having a gasket over the hole for forming the bubble cap assembly having minimum leakage, (d) said inner tubular sleeve having two opposite sides of the upper portion thereof cut inwardly a distance to include about 120° of the circumference of each of said two opposite sides, (e) said two cut portions of said inner tubular sleeve being bent kidney shaped and contiguous with said upright hold-down stud, and (f) said two kidney bent shaped portions being rigidly secured to said upright hold-down stud for providing a bubble cap assembly of reduced number of pieces requiring a reduced number of fabrication steps for lowering fabrication costs of the complete bubble cap assembly.

6. A bubble cap assembly for sealing a hole having upper and lower peripheral surfaces in a tray deck comprising, (a) an inner tubular sleeve and a tubular riser therearound said inner tubular sleeve, (b) said inner tubular sleeve supporting a bubble cap and having a lower flanged end with a gasket thereon, said tubular riser having a lower flanged end with a gasket thereunder, (c) an upright stud with pressure applying means thereon for sealing said lower flanged ends of both said tubular riser and said inner tubular sleeve to the respective upper and lower peripheral surfaces around the hole for providing a double seal between the tray deck and the bubble cap assembly for minimizing leakage and for assuring proper alignment of said bubble cap relative to the tray deck, (d) said inner tubular sleeve having two opposite sides of the upper portiion thereof cut inwardly a distance to include about 120° of the circumference of each of said two opposite sides, (e) said two cut portions of said inner tubular sleeve being bent kidney shaped and contiguous with said upright hold-down stud, and (f) said two kidney bent shaped portions being rigidly secured to said upright hold-down stud for providing a bubble cap assembly of reduced number of pieces requiring a reduced number of fabrication steps for lowering fabrication costs of the complete bubble cap assembly.

7. A bubble cap assembly for sealing a hole having upper and lower peripheral surfaces in a tray deck comprising, (a) an inner tubular sleeve, a tubular riser positioned around said inner tubular sleeve, a bubble cap mounted on said tubular riser, and an upright hold-down stud for holding down said bubble cap, (b) said inner tubular sleeve having a lower flanged end telescopic with the inner surface of said tubular riser having a lower flanged end, (c) a gasket for sealing said lower flanged ends of both said telescopic tubular riser and said inner tubular sleeve to the respective upper and lower peripheral surfaces around the hole for providing a double seal between the tray deck and said inner tubular sleeve and said tubular riser for minimizing leakage and for assuring proper alignment of said bubble cap relative to the tray deck, (d) said inner tubular sleeve having two opposite sides of the upper portion thereof cut inwardly a distance to include at least substantially 120° of the circumference of each of said two opposite sides, (e) said two cut portions of said inner tubular sleeve being bent kidney shaped and contiguous with said upright hold-down stud, and (f) said two kidney bent shaped portions being rigidly secured to said upright hold-down stud for providing a bubble cap assembly of reduced number of pieces requiring a reduced number of fabrication steps for lowering fabrication costs of the complete bubble cap assembly.

8. A bubble cap assembly comprising, (a) an inner tubular sleeve with a tubular riser therearound supporting a bubble cap, and an upright hold-down stud supported on said inner tubular sleeve for holding down the bubble cap, (b) said inner tubular sleeve having two opposite sides of the upper portion thereof cut inwardly a distance to include about 120° of the circumference of each of said two opposite sides, (c) said two cut portions of said inner tubular sleeve being bent kidney shaped forming two side portions of substantial length axially of said upright hold-down stud and contiguous with said upright hold-down stud therein, and (d) said two kidney bent shaped side portions of substantial length being rigidly secured to said upright hold-down stud along the length thereof for providing a bubble cap assembly of reduced number of pieces requiring a reduced number of fabrication steps for lowering fabrication costs of the complete bubble cap assembly.

9. A bubble cap assembly comprising, (a) a tubular sleeve with a tubular riser therearound supporting a bubble cap, said inner tubular sleeve having two opposite sides of the upper portion thereof cut inwardly a distance to include 120° of the circumference of each of said two opposite sides, (b) said two cup portions of said inner tubular sleeve being bent kidney shaped forming two side portions of substantial length axially of an upright hold-down stud therein and contiguous with said upright hold-down stud supported therein, and (c) said two kidney bent shaped side portions of substantial length being rigidly secured to said upright hold-down stud along the length thereof for providing a bubble cap assembly of reduced number of pieces requiring a reduced number of fabrication steps for lowering fabrication costs of the complete bubble cap assembly.

* * * * *